Jan. 8, 1924.

G. W. REUST

CULTIVATOR

Filed July 29, 1922  3 Sheets-Sheet 1

1,480,184

Inventor:
G. W. REUST,
By W. J. Fitz Gerald & Co.
Attorney.

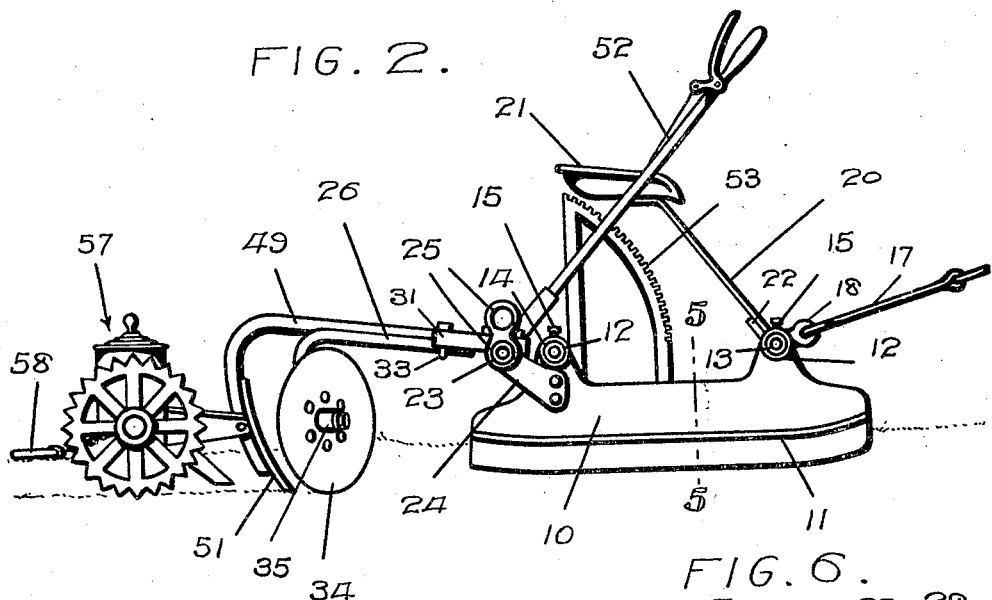
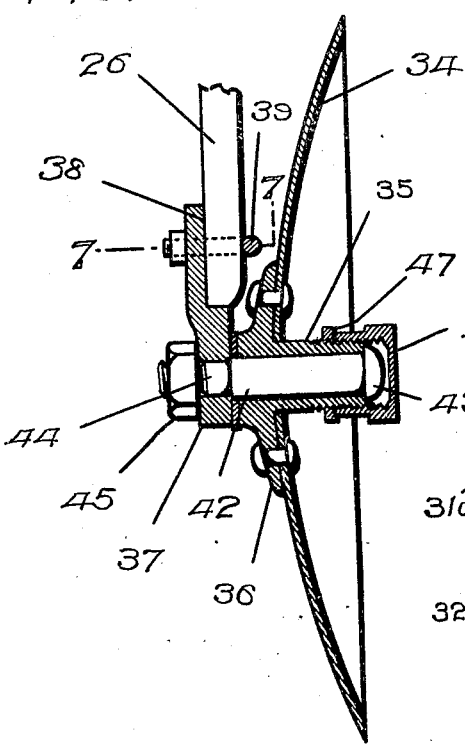
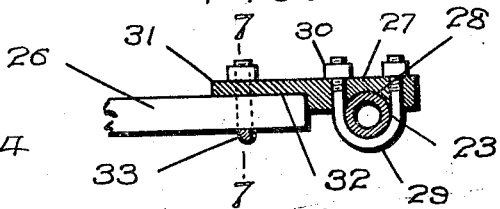
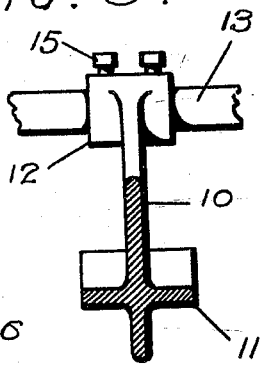

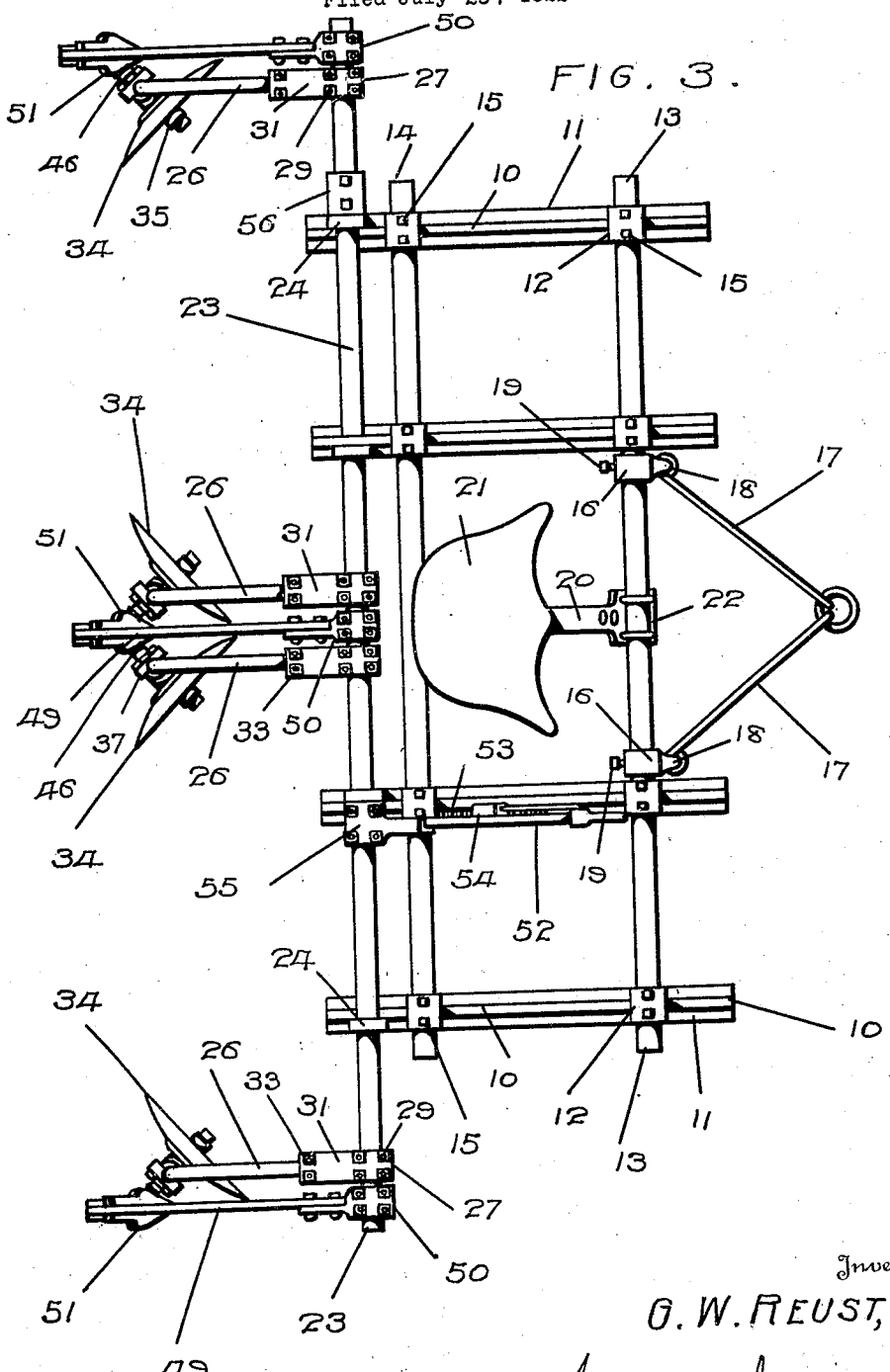

Patented Jan. 8, 1924.

1,480,184

UNITED STATES PATENT OFFICE.

GEORGE W. REUST, OF GOODWELL, OKLAHOMA.

CULTIVATOR.

Application filed July 29, 1922. Serial No. 578,373.

*To all whom it may concern:*

Be it known that I, GEORGE W. REUST, a citizen of the United States, residing at Goodwell, in the county of Texas and State of Oklahoma, have invented certain new and useful Improvements in Cultivators; and I do hereby declare the following to be a full, clear, and exact description of the invention, such as will enable others skilled in the art to which it appertains to make and use the same.

The present invention relates to cultivators, such as used for preparing the ground for planters trailing in rear, or for the cultivation of the growing crops, and the invention aims to provide a novel and improved cultivator construction which is practical and efficient for the intended purposes.

Another object is the provision of a novel and improved runner frame to slide on the ground for carrying the soil working elements, and having improved features of construction to render it especially useful for the purposes of the present invention.

A further object is the provision of novel means for connecting the soil working elements adjustably with the frame for the positioning of said elements in different relations and arrangements for various conditions in practice.

A still further object is the provision of a novel and improved mounting for the cultivator disks.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a side elevation of the construction as seen in Fig. 1.

Fig. 3 is a plan view showing the parts rearranged for cultivation.

Fig. 4 is an enlarged vertical section of one of the cultivator disks and its mounting.

Fig. 5 is a section on the line 5—5 of Fig. 2.

Fig. 6 is a section on the line 6—6 of Fig. 1.

Fig. 7 is a cross section on the line 7—7 of either Figs. 4 and 6.

Figure 1:
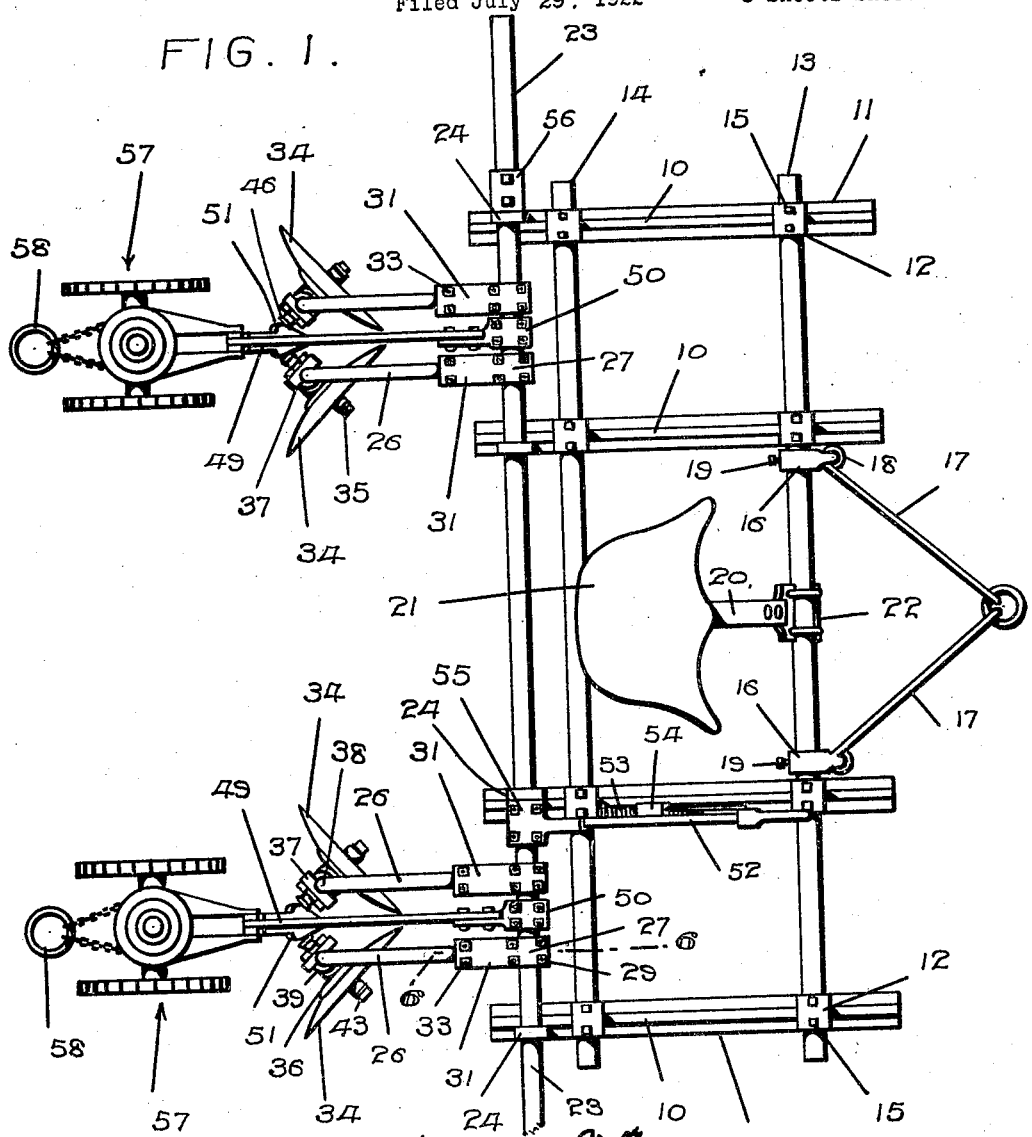
Figure 1 is a plan view of the cultivator with the parts arranged and planters attached for planting seed.

The runner frame includes a set of transversely spaced parallel runners, each runner being composed of a sheet metal web or plate 10 disposed in a vertical longitudinal plane, and provided at opposite sides with the outstanding longitudinal runner flanges 11 to run on the ground, with the lower edge portion of the web or plate projecting below said flanges in order to enter the ground and guide the runner for longitudinal movement, thereby preventing the transverse or sidewise displacement of the frame. The flanges 11 are curved upwardly slightly at their ends so as to move smoothly over the ground without catching or entering the ground. The plates or webs 10 are provided at their upper edges near the opposite ends thereof with transverse sleeves 12 through which front and rear transverse rods 13 and 14, respectively, extend, for fastening the runners together. The sleeves 12 are slidable on the rods longitudinally of said rods, for adjusting the runners transversely to different positions, and the sleeves 12 have set screws 15 or other means for securing them in position on said rods. As shown, there are four runners, to be arranged in two pairs to run at the opposite sides of two rows, and said runners can be spaced apart different distances as may be desired.

The draft means or rods 17 for hitching the draft animals to the cultivator are attached by the use of collars 16 fitted on the front rod 13 at suitable points on said rod, and the rods 17 and collars 16 having interengaging eyes 18. The collars 16 have set screws 19 or other means for securing them in place on the rod 13.

The supporting bracket or spring 20 which carries the operator's seat 21 is secured by a clamp 22 to the front rod 13.

The soil working elements trail in rear of the frame and are attached to a transverse rod 23 in rear of the rod 14. Said rod 23 carries the soil working elements and is supported by means of brackets 24 secured to the runners and projecting behind the rod 14, the brackets having vertically spaced openings 25 for receiving the rod 23 at different vertical positions, for purpose of vertical adjustment under different conditions.

Cultivator disk beams 26 are provided, same being formed of rods or circular stock, and said beams are adjustably secured to the carrying rod 23 by means of the clamping members 27. Each of said members is provided near its forward end with a transverse groove 28 fitting the rod 23, and U-bolts 29 fit astride said rod and have their terminals engaged through said member and provided with nuts 30 for tightening the bolts to clamp the member 27 in adjusted position on the rod 23. By loosening said bolts, the member may be slid longitudinally on the rod transversely of the cultivator, and the member may also be adjusted around the axis of the rod, in order that the beam 27 can be properly positioned. The clamping member 27 has the rearwardly extending tongue 31 provided with a longitudinal groove 32 for receiving the forward end terminal of the corresponding beam 26, and a U-bolt 33 is engaged through the tongue 31 across the groove 32 for clamping the beam 26 in said groove, the bolt extending across or around said beam. When the bolt 33 is loosened, the beam 26 may be turned about its axis to adjust the angle of the downturned rear terminal of the beam.

Each beam 26 carries a cultivator disk 34 at its rear terminal, and the mounting for supporting the disk from the beam is shown in detail in Fig. 4. A hub 35 is provided for the disk having an annular flange 36 riveted or otherwise secured to the rear surface or back of the disk, and a hanger 37 is provided for supporting the disk from the rear depending terminal of the beam 26. The upper end portion of said hanger has a longitudinal groove 38 receiving the rear terminal of the beam, and a U-bolt 39 extends across said groove and beam and engages through the hanger 37 for clamping the beam and hanger together similar to the attachment of the forward terminal of the beam to the clamping member 27. The bolt 39, when loosened, enables the hanger 37 to be adjusted around the axis of the rear terminal of the beam. This provides for two adjustments of the disk 34, in connection with the adjustment of the beam with reference to the clamping member 27. Thus, by loosening the bolt 33, the beam and disk can be adjusted about the axis of the forward terminal of the beam, and by loosening the bolt 39, the disk can be adjusted around the axis of the rear depending terminal of the beam, which enables the disk to be positioned at the desired angle. The hub 35 is mounted for rotation on a forwardly extending bolt or spindle 42 which has a head 43 at its forward end abutting the forward end of the hub 35. A nut 45 is threaded on the rear terminal of the bolt or spindle and bears against the hanger 37 for securing the bolt or spindle in place, and retaining the hub of the disk for rotation on the spindle. The rear terminal of the bolt or spindle is reduced in diameter, as at 44, to provide a shoulder to bear against the hanger 37. A cap nut 46 is threaded on the forward end of the hub 35 over the forward end of the spindle to provide a grease containing member which is secured in place by a lock nut 47 on the hub. When said cap nut is screwed on the hub, the grease will be forced into the hub, in order to inject lubricant between the hub 35 and spindle.

Shovel beams 49 are secured at their forward ends to clamp members 50 which are clamped on the rod 23 the same as the members 27 for the adjustment of the beams 49 longitudinally and angularly of the rod 23. The rear downturned terminals of the beams 49 have the shovels or cultivator blades 51 secured thereto in any well known manner.

The rod 23 is turned by means of a lever 52 secured to a clamp member 55 which embraces the rod 23 the same as the clamp members 27 and 50, and the lever extends upwardly and forwardly to a position at one side of the seat 21 to be conveniently operated. A notched segment 53 is secured to the corresponding runner below the lever, for the engagement of a dog 54 carried by the lever to hold the lever in any desired angle, thereby holding the rod 23 and soil working elements in the corresponding angular position. When the lever is swung forwardly and downwardly, the rod or shaft 23 is turned for raising the soil working elements out of the ground, and the lever in being swung rearwardly and upwardly, will swing the beams 26 and 49 downwardly, causing the soil working elements to enter the ground to the desired depth. The clamping member 55 bears against one of the brackets 24, and a collar 56 is secured on the rod 23 to bear in the opposite direction against one of the brackets, for preventing the rod 23 from shifting longitudinally out of position.

When using the cultivator for planting, the beams 26 are arranged in pairs, with the beams 49 between them, and the disks 34 are set for deflecting the dirt to opposite sides from the paths of the seed planters 57 which are connected to the beams 49 to trail in rear of the shovels 51. The dirt is thus piled up between the rows to be thrown back toward the rows by later cultivation when the plants are growing. The shovels 51 following behind the pairs of disks 34 will open seed furrows in which the seed is dropped by the planters 57, and said planters have seed coverers 58 trailing in rear thereof for throwing some dirt over the seed. The sets of beams can be spaced apart according to the distance desired between the rows of plants. In this arrangement, it will be noted that the beams and soil working elements trail from the rod or shaft 23 in rear of the spaces between the runners of the pairs, the runners sliding on the ground at opposite sides of the rows to be planted and the soil working elements moving along such rows.

When cultivating the growing plants the beams are positioned to move between the rows of plants, as seen in Fig. 3. In this arrangement there are two beams 26 and a beam 49 located between the two pairs of runners, and a beam 26 and beam 49 at each end of the rod 23, to move along the opposite sides of the two rows over which the runner frame passes. Two rows are thus cultivated at the same time, the disks 34 being positioned for throwing the dirt toward the plants, and the shovels 51 following in rear of the disks.

The soil working elements can thus be arranged in different positions on the rod or shaft 23 under different conditions, for planting and cultivation, and the soil working elements as well as runners are adjustable transversely for rows spaced different distances apart, and to position the runners and soil working elements the desired distances from the rows.

Figure 8:
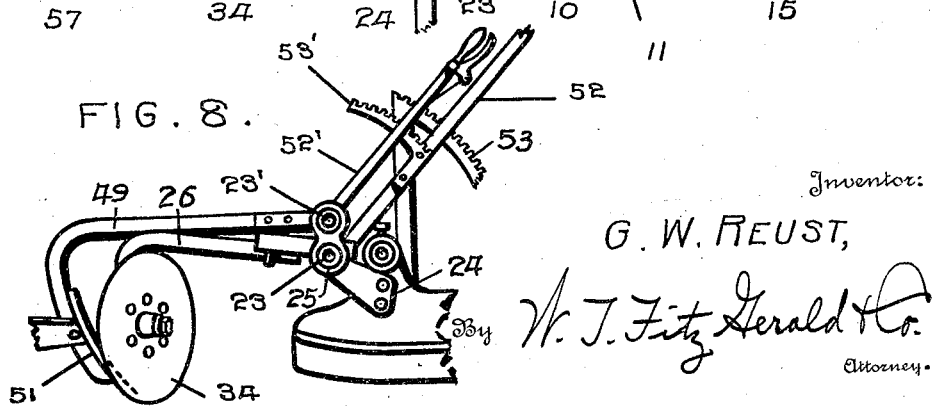
Fig. 8 is a fragmentary side elevation showing another arrangement of the parts for planting.

Fig. 8 shows another arrangement for use when planting. Thus, the transverse rod 23 is disposed in the lower openings 25 of the brackets 24, and another rod 23′ is disposed in the upper openings 25 above the lower rod 23. The cultivator disk beams and shovel beams can then be attached to the two rods 23 and 23′ for independently adjusting the disks and shovels upwardly and downwardly. As shown, the disk beams 26 are secured to the lower rod 23, while the shovel beams 49 are connected to the upper rod 23′. The rod 23 has an adjusting lever 52 while the upper rod 23′ has a similar adjusting lever 52′, whereby the two sets of beams can be adjusted upwardly and downwardly independently, instead of the beams being adjusted simultaneously with the arrangement as shown in Figs. 1 and 2. The rack or segment 53′ for holding the lever 52′ is preferably carried by the lever 52. In this way, the beams 26 are adjusted by the positioning of the lever 52, and the shovels 51 can then be adjusted by adjusting the lever 52′ relatively to the lever 52, and by swinging the lever 52 the disks and shovels can all be raised from the ground simultaneously. In this manner, the disks 34 can be positioned as desired, and the shovels 51 then adjusted independently to regulate the depth of planting independent of the vertical adjustment of the disks 34.

Having thus described the invention, what is claimed as new is:—

1. A cultivator comprising runners having vertical plates with runner flanges extending therefrom to run on the ground, said plates extending below said flanges to enter the ground and prevent transverse displacement of the runners, and soil working elements carried from said runners.

2. A cultivator comprising transversely spaced runners, means adjustably connecting said runners to space them different distances apart, brackets carried by said runners, a transverse rod carried by said brackets, soil working element beams, and clamps carrying said beams and mounted on said rod for longitudinal and angular adjustments.

3. A cultivator comprising transversely spaced runners, means adjustably connecting said runners to space them different distances apart, brackets carried by said runners, a transverse rod carried by said brackets, soil working element beams, clamps carrying said beams and mounted on said rod for longitudinal and angular adjustments, and adjusting means connected to said rod and one runner for positioning said rod in different angles about its axis.

4. A cultivator comprising a frame having brackets, a transverse rod mounted in said brackets, means for turning said rod, beams for the soil working elements, and clamping members carrying said beams and mounted for adjustment on said rod longitudinally and angularly of the rod.

5. In a cultivator, a transverse rod, a beam, a clamping member having means to embrace said rod for adjustments longitudinally and angularly of said rod, and having means for clamping the beam for angular adjustment, and a soil working element supported from the beam.

6. In a cultivator, a transverse rod, a rearwardly extending beam having its rear terminal downturned, a clamping member having means embracing said rod for adjustments longitudinally and angularly of the rod, and having means embracing the forward terminal of the beam for the angular adjustment of the beam, a cultivator disk, and means for supporting the disk embracing the rear downturned terminal of the beam for angular adjustment.

7. A cultivator having a frame, a pair of transverse rods mounted in the frame, two sets of beams attached to said rods, an adjusting lever for each rod, means for holding one lever in different positions, and means for holding the other lever in different positions relatively to the firstnamed lever.

8. A cultivator comprising a frame, a pair of rods mounted for turning movement in the frame, two sets of soil working elements connected to said rods, means for adjusting one rod and holding the corresponding soil working elements in different positions, and means for adjusting the other rod with reference to the aforesaid means for positioning the other set of soil working elements and for also moving the secondnamed set of soil working elements with the firstnamed set.

9. A cultivator comprising a frame, a pair of rods mounted for turning movement in the frame, two sets of soil working elements connected to said rods, a lever for each rod for turning same, means for positioning one lever in different positions, and means carried by one lever for positioning the other lever in different positions relatively to the firstnamed lever and for enabling both levers to be swung simultaneously.

In testimony whereof I have signed my name to this specification.

GEORGE W. REUST.